Aug. 2, 1966   G. F. BOISJOLY   3,263,704
COLLAPSIBLE SUPPORT DUCT FOR REMOVABLE ELEMENT
Filed July 16, 1964   2 Sheets-Sheet 1

INVENTOR
G. F. BOISJOLY

Fetherstonhaugh & Co.
ATTORNEYS

Aug. 2, 1966    G. F. BOISJOLY    3,263,704
COLLAPSIBLE SUPPORT DUCT FOR REMOVABLE ELEMENT
Filed July 16, 1964    2 Sheets-Sheet 2

INVENTOR
G.F. BOISJOLY

Fetherstonhaugh & Co.
ATTORNEYS

United States Patent Office 3,263,704
Patented August 2, 1966

3,263,704
COLLAPSIBLE SUPPORT DUCT FOR REMOVABLE ELEMENT
Gerald F. Boisjoly, Montreal, Quebec, Canada, assignor to Farr Company Ltd., Montreal, Quebec, Canada
Filed July 16, 1964, Ser. No. 383,030
9 Claims. (Cl. 138—42)

This invention relates to an improved device which facilitates installation and removal of air filters as used in heating and ventilating systems, and particularly the installation and removal of high efficiency air filters as used in air conditioning systems for hospital operating rooms, atomic energy power stations, etc.

This invention could also be easily adapted to improve many other situations where convenient installation and removal of an element, positioned between fixed opposing faces, is required.

In conventional heating and ventilating systems one usual arrangement for positioning filter elements in ducting is to provide flanges on the ducting to position the filter element between the flanges, and to securely clamp the filter element in position by the tightening of bolts positioned through the duct flanges.

This arrangement has many disadvantages, including the fact that the ducts and flanges have to be forced apart to provide the required clearance for removing the filter element. This can prove to be difficult when the ducts are very rigid. Forcing the ducting and flanges apart also distorts the ducting when excessive force is used.

Another conventional arrangement for positioning filter elements in ducting is to enclose the filter element in a rigid casing and to provide nipples at each end of the casing. The ducting is provided, at each end of the opening for the filter element, with corresponding nipples and the filter element and casing is positioned in the opening with the nipples aligned. The nipple are then taped to provide air-tight connections. This arrangement has many disadvantages, the main one being that the casing is constructed as part of the filter element and adds considerably to the cost thereof. This can prove to be a considerable disadvantage, particularly when the filter elements used are of the disposable type.

The present invention overcomes the disadvantages inherent in the conventional arrangements by providing a mechanical clamp arrangement, in combination with a spring loaded collapsible duct portion which enables a reuseable, or disposable, filter element to be easily installed and clamped in position in leak tight engagement with the duct faces, and to be removed merely by releasing the clamping arrangement and allowing the collapsible duct portion to provide adequate clearance for convenient removal of the filter element.

It is, therefore, the main object of the present invention to provide an improved clamping arrangement to facilitate convenient installation and removal of filter elements in duct systems, without the need for additional filter element casings.

Another object of the present invention is to provide an improved clamping arrangement to facilitate convenient installation and removal of filter elements in duct systems, said installation embodying leak-tight connecting faces without need for taping of joints, etc.

Another object of the present invention is to provide an improved clamping arrangement to facilitate convenient installation and removal of filters in duct systems without the need for use of any tools or special equipment.

A further object of the present invention is to provide an improved clamping arrangement in combination with a spring loaded collapsible duct portion, to facilitate convenient installation and removal of filter elements in duct systems without damage to the ducts.

These and other objects and advantages of the present invention will be further apparent by reference to the following detailed specification and drawings, in which.

Figure 1:
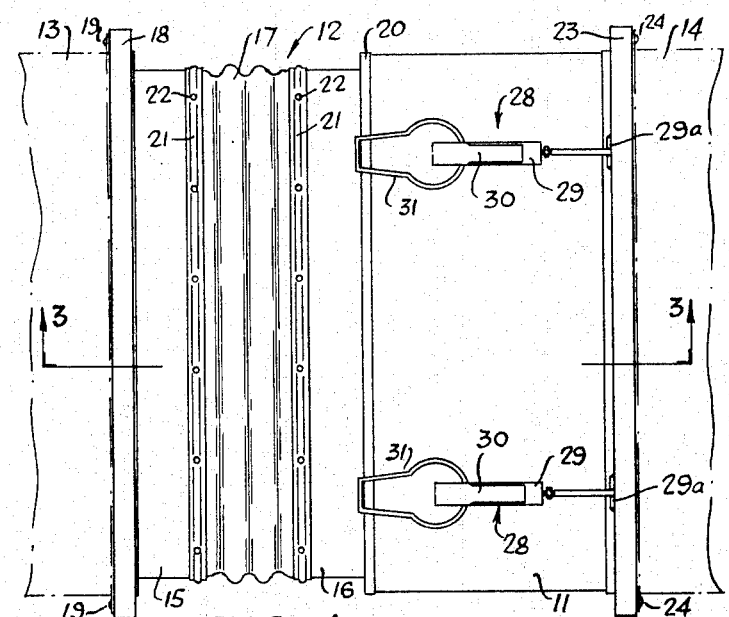
FIG. 1 is a front elevation of the filter element and collapsible frame positioned between flanges of a heating or ventilating duct system.

Refer now to the figures, in which like numerals represent like parts throughout the several views, filter element 11 and collapsible intermediate frame 12 are positioned between fixed ducts 13 and 14.

Collapsible intermediate frame 12 comprises rigid duct member 15, rigid duct member 16 and convoluted flexible diaphragm 17. Flexible diaphragm 17 is made of neoprene or other suitable material.

Rigid duct member 15 is securely attached to rigid flange 18, and flange 18 is securely attached to duct 13 by sheet metal screws 19, or other suitable means. Rigid duct member 16 is removably positioned against filter element 11 by flange 20. Convoluted flexible diaphragm 17 is securely attached to rigid duct members 15 and 16 by clamping strips 21 and sheet metal screws 22.

Rigid flange 23 is securely attached to duct 14 by sheet metal screws 24, or other suitable means.

Rigid duct members 15 and 16 are biased towards each other by springs 25 attached to flanges 26 and 27 of duct members 15 and 16, respectively.

Clamp means 28 are pivotally mounted on flange 23 and extend to engage flange 20 of rigid duct member 16, such that filter element 11 is securely clamped therebetween.

Figure 2:
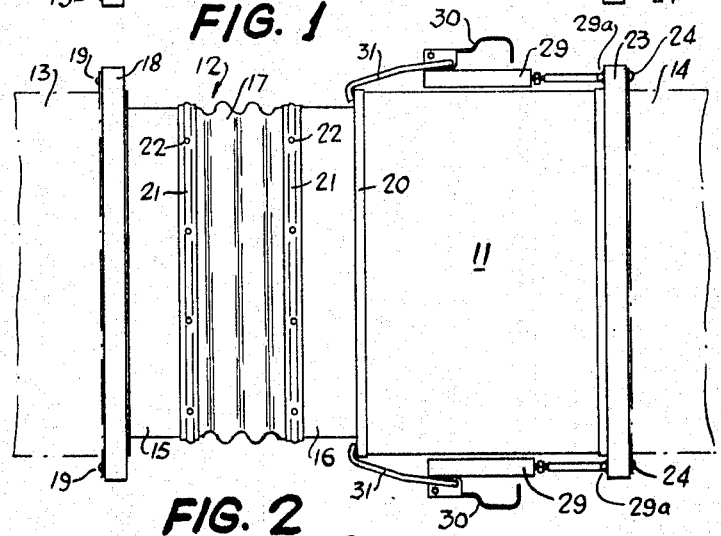
FIG. 2 is a side elevation of the filter element and collapsible frame shown in FIG. 1.
Figure 6:
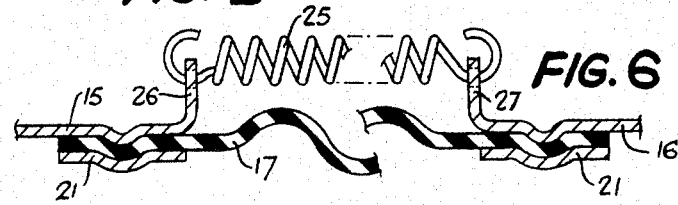
FIG. 6 is a section, to an enlarged scale, as shown encircled at 6 in FIG. 3.
Figure 3:
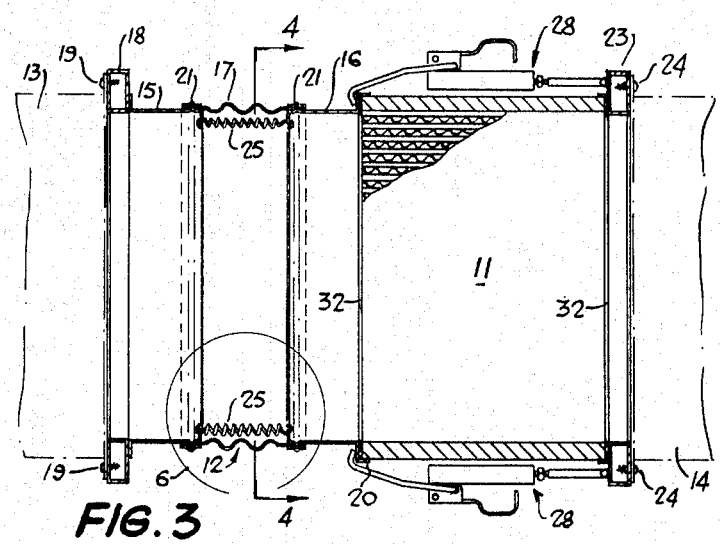
FIG. 3 is a section on 3—3 in FIG. 1.
Figure 4:
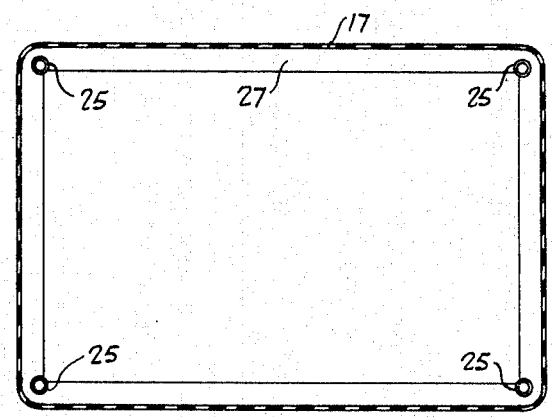
FIG. 4 is a section on 4—4 in FIG. 3.

Each clamp means 28 comprises body member 29, pivotally mounted by pivot 29a on flange 23, lever member 30 pivotally mounted on body member 29 and hook member 31 pivotally mounted on lever member 30 and engaging flange 20 of rigid duct member 16. The pivotal positions of hook member 31 on lever member 30, and lever member 30 on body member 29, are arranged to provide an over-centre motion, such that when lever member 30 is flat against the face of body member 29, as shown in FIG. 2, hook member 31 rigidly engages flange 20, and when lever member 30 is rotated away from body member 29, as shown in FIG. 5, hook member 31 is released from flange 20.

Gaskets 32, made of neoprene or other suitable material, are positioned between filter element 11 and flange 20 of rigid duct 16, and between filter element 11 and flange 23, to provide air-tight joint faces. Gaskets 32 are adhesively attached to the faces of filter element 11.

Figure 5:
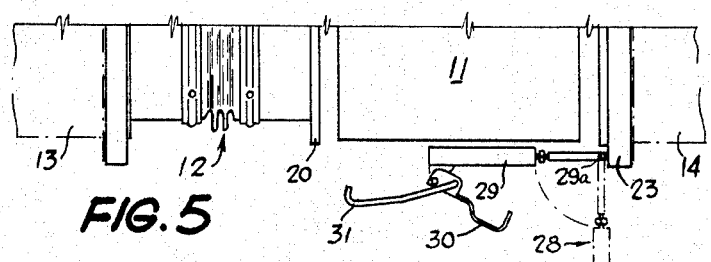
FIG. 5 is a partial view, similar to FIG. 2, but showing the clamping means disconnected and the collapsible frame providing adequate clearance for the removal of the filter element.

It is thus seen that when clamp means 28 are released, collapsible intermediate frame 12 will collapse under the pull of springs 25 and filter element 11 may be removed, as shown in FIG. 5. To replace filter element 11 it is simply a matter of positioning it against flange 23 on duct 14, extending collapsible intermediate frame 12 to engage filter element 11, and closing clamp means 28 to securely engage flange 20 of rigid duct member 16.

It is to be understood that the arrangement shown and described in this specification is by way of being the preferred execution of this invention and that variations in the general arrangement of component parts can be made without departing from the spirit of the invention.

What I claim is:

1. In an air conditioning system or like installation, duct means having two fixed spaced apart transverse duct faces, a filter element removably positioned against one of said duct faces, a collapsible duct portion positioned between the other of said duct faces and said filter element and securely attached to said other duct face, and releasable clamp means adapted to clamp said filter element to said collapsible duct portion and to said first mentioned duct face, said collapsible duct portion adapted to collapse to provide axial clearance for the removal of said filter element when said clamp means is released.

2. An air conditioning system as set forth in claim 1 in which said collapsible duct portion comprises a rigid duct member securely attached to said other duct face, a rigid duct member adjacent said filter element, and a collapsible duct member interconnecting said rigid duct members.

3. An air conditioning system as set forth in claim 2 in which said collapsible duct member comprises a convoluted flexible diaphragm.

4. An air conditioning system as set forth in claim 2 in which said collapsible duct member is biased towards a collapsed position by spring means extending between said rigid duct members.

5. In an air conditioning system or like installation, duct means having two fixed spaced apart transverse duct faces, a filter element removably positioned against one of said duct faces, a collapsible duct portion positioned between the other of said duct faces and said filter element and securely attached to said other duct face, and releasable clamp means extending between said first mentioned duct face and the face of said collapsible duct portion adjacent said filter element to securely clamp said filter element therebetween, said collapsible duct portion adapted to collapse to provide axial clearance for the removal of said filter element when said clamp means is released.

6. In an air conditioning system or like installation, duct means having two fixed spaced apart transverse duct faces, a filter element removably positioned against one of said duct faces, a collapsible duct portion positioned between the other of said duct faces and said filter element and securely attached to said other duct face, said collapsible duct portion comprising a rigid duct member securely attached to said other duct face, a rigid duct member adjacent said filter element and a convoluted flexible diaphragm interconnecting said rigid duct members, and releasable clamp means extending between said first mentioned duct fact and said rigid duct member adjacent said filter element and securely clamping said filter element therebetween, said collapsible duct portion adapted to collapse to provide axial clearance for the removal of said filter element when said clamp means is released.

7. An air conditioning system as set forth in claim 6 in which said convoluted flexible diaphragm is biased towards a collapsed position by spring means extending between said rigid duct members.

8. An air conditioning system as set forth in claim 6 in which the connections between the faces of said filter element adjacent said first mentioned duct face and said second mentioned rigid duct member are sealed against air leakage by flexible gasket means interposed between the adjacent faces.

9. An air conditioning system as fet forth in claim 8 in which said convoluted flexible diaphragm and said gasket means are composed of neoprene.

References Cited by the Examiner

UNITED STATES PATENTS

| 1,076,738 | 10/1913 | Berry | 285—224 |
| 2,056,022 | 9/1936 | Steenstrup | 138—42 |
| 2,254,157 | 8/1941 | Shaw | 138—103 |
| 2,305,809 | 12/1942 | Maisch | 285—226 |

FOREIGN PATENTS

| 854,763 | 11/1960 | Great Britain. |

JOHN F. CAMPBELL, *Primary Examiner.*

THOMAS H. EAGER, *Examiner.*